Figure 7:
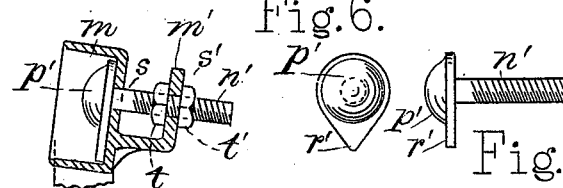

(No Model.) 2 Sheets—Sheet 1.
W. ROBINSON.
CAR BRAKE.
No. 553,871. Patented Feb. 4, 1896.
Fig. 1.
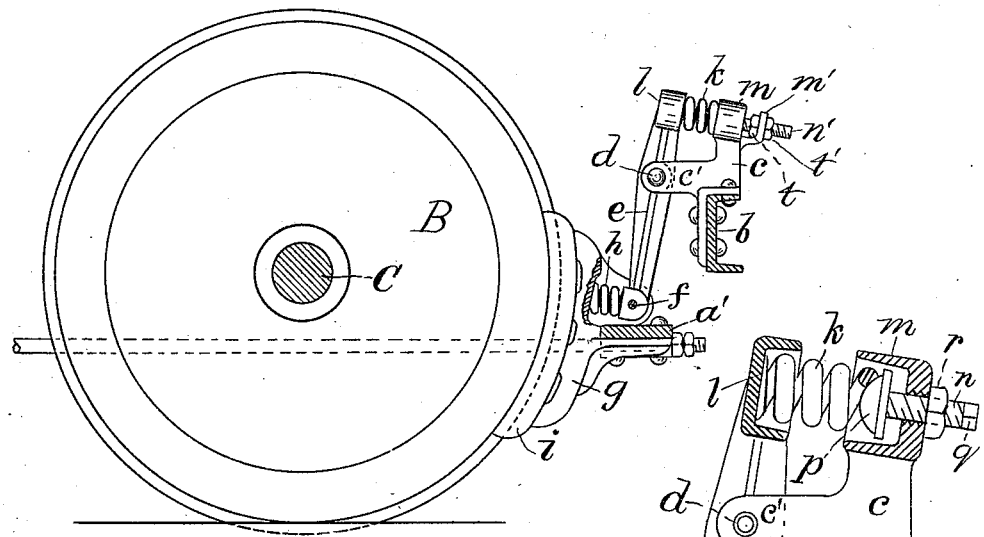
Fig. 3.
Fig. 2.
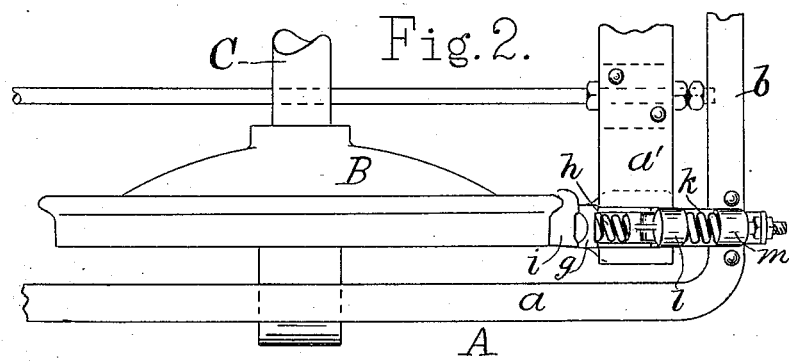
Fig. 4. 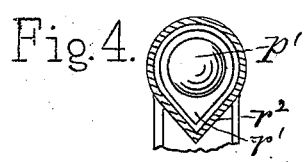 Fig. 6.

Fig. 5.
WITNESSES: 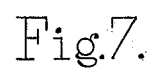 INVENTOR:
James H. Ripley.  Wm. Robinson.
J. W. Bigely. 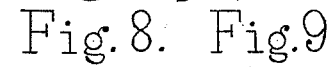
Fig. 8. Fig. 9.

(No Model.) 2 Sheets—Sheet 2.
W. ROBINSON.
CAR BRAKE.
No. 553,871. Patented Feb. 4, 1896.
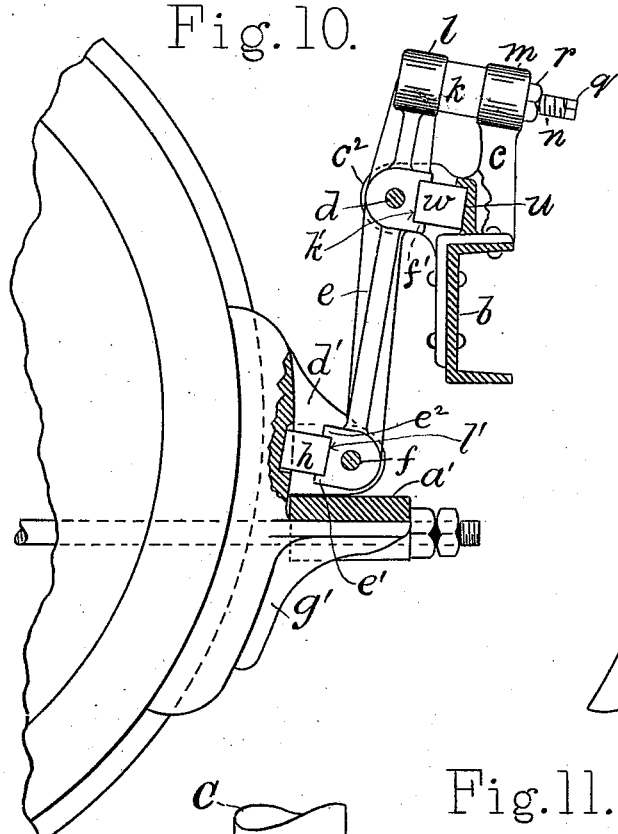
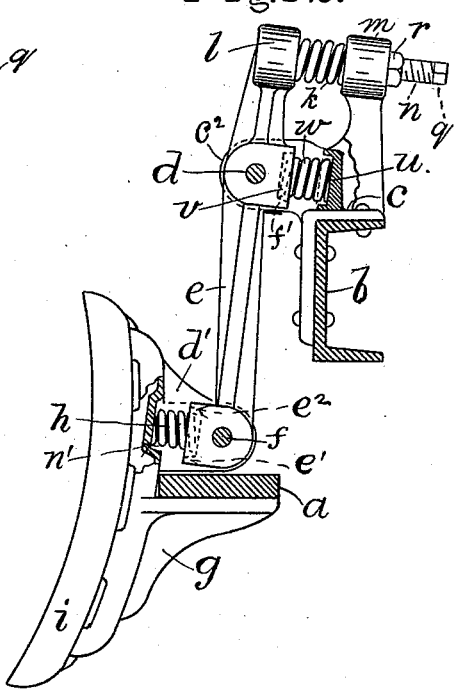
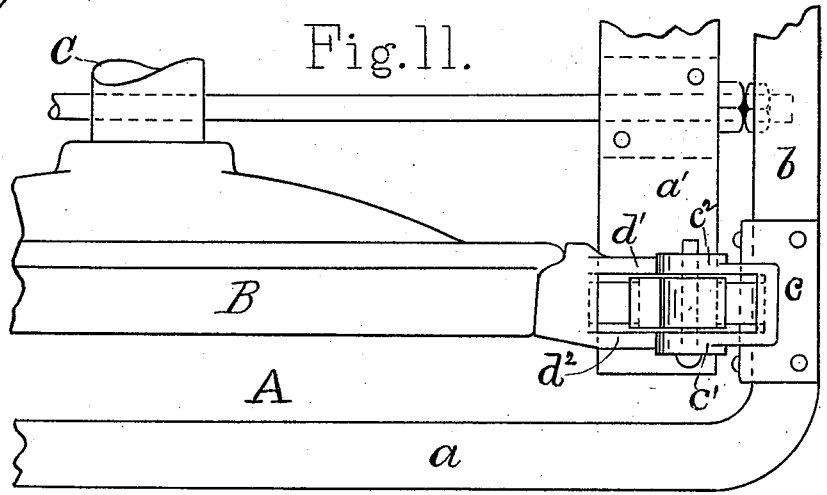
WITNESSES:
James W. Ripley.
J. W. Bigsby.
INVENTOR:
Wm. Robinson.

UNITED STATES PATENT OFFICE.

WILLIAM ROBINSON, OF BOSTON, MASSACHUSETTS.

CAR-BRAKE.

SPECIFICATION forming part of Letters Patent No. 553,871, dated February 4, 1896.

Application filed September 17, 1894. Serial No. 523,225. (No model.)

*To all whom it may concern:*

Be it known that I, WILLIAM ROBINSON, a citizen of the United States, residing at Boston, in the county of Suffolk and State of Massachusetts, have invented certain new and useful Improvements in Car-Brakes, of which the following is a specification.

The nature of my invention will be understood from the description which follows, reference being had to the accompanying drawings, which form a part of this specification, in which—

Figure 1 is a side elevation, partly in section, of a portion of a car-truck, illustrating the main features of my invention. Fig. 2 is a plan view of the same. Fig. 3 is a side elevation, partly in section, showing an alternate form of a portion of my invention. Figs. 4, 5, 6, 7, 8, and 9 show details. Fig. 10 is a side elevation, partly in section, showing my invention more fully developed than in the preceding figures and illustrating the use of rubber cushions for springs. Fig. 11 is a plan view of the same; and Fig. 12 is a similar view to that shown in Fig. 10, but illustrating the use of spiral springs instead of rubber cushions.

A is a truck-frame having side members, $a$, and end members, $b$, and provided with wheels B, mounted on axles C in the usual manner. The end $b$ of the truck-frame is provided with a hanger-support $c$, preferably consisting of a casting, in which is pivoted at $d$ the lever brake-hanger $e$, which extends, as shown, both below and above or beyond the fulcrum-point $d$. The lower end of said lever brake-hanger $e$ is pivoted at $f$ to the brake-head $g$ and supports the latter.

The spring $h$ is inserted between the brake-head $g$ and the lower end of the hanger $e$, as clearly shown, especially in Figs. 10 and 12, in which a recess or socket for the reception and retention of said spring $h$ is shown both in the brake-head and in the lower end of said hanger $e$. Thus, as will be seen, the spring $h$, continuously pressing the hanger $e$ against the side of the pivot $f$, makes rattling at this point impossible—that is, the spring or cushion $h$ becomes an antirattler.

The spring or cushion $k$ is inserted between the upper end, $l$, of the hanger $e$ and the upper socket or retainer, $m$, of the hanger-support $c$, both as clearly shown in Fig. 1 and in section in Fig. 3. This spring $k$ is the brake-release spring, and, as is evident, when it expands it presses the upper end, $l$, of the hanger $e$ away from the socket $m$ of the hanger-support $c$, thus of course throwing the lower end of said hanger $e$ in the opposite direction—that is, withdrawing the brake-head $g$ with its brake-shoe $i$ from the wheel B.

Means are provided for adjusting the tension of the brake-release spring $k$. As shown in Fig. 3, the screw-bolt $n$ is screwed into the tapped back of the socket $m$. Said bolt $n$ presses against or forms a part of the inner platform, $p$, which presses directly against the spring $k$ and forms a seat for the same. To adjust the tension of said spring $k$ a wrench is used on the squared end $q$ of said bolt $n$ to turn the same. When said bolt $n$ is in proper position, the lock-nut $r$ is screwed up tight against the back of the socket $m$, as shown in Fig. 3.

As illustrated in Figs. 1, 4, 5, 6 and 7, the tension adjustment of the spring $k$ is accomplished in a somewhat different manner. In this case the screw-bolt $n'$ is provided with an inner platform-head, $p'$, which is prevented from turning by means of the projection $r'$ pressing against the side $r^2$ of the socket $m$, as shown especially in Fig. 4. The bolt $n'$ passes through smooth holes $s$ and $s'$ in the socket $m$ and projection $m'$. The turning of the nut $t$ adjusts the bolt $n'$, thus bringing any desired compression upon the spring $k$, and the nut $t'$ locks said bolt in position, all of which will be clearly understood by inspection of the figures.

The brake-release spring $k$ will usually answer also as an antirattler for the fulcrum $d$; but in order to insure noiselessness at this point I prefer to use a special antirattler, as illustrated in Figs. 10 and 12, in which the hanger-support $c$ is provided with the socket or holder $u$ opposite the fulcrum $d$, while the lever-hanger $e$ is also provided with a corresponding socket or holder $v$. Between these two points the spring or cushion $w$ is inserted under compression. Thus it will be seen the said spring $w$, pressing the hanger $e$ firmly against one side of the pivotal bolt $d$ and the opposite side of said bolt against the hanger-support c, prevents all rattling at this point.

While I have illustrated my invention only as applied to one corner of a truck, it will be understood, nevertheless, that it is to be applied to all the brakes on the truck. Furthermore, my invention is equally applicable when a brake-head g, carrying an independent brake-shoe i, as hereinbefore described, is used, and also when said brake head and shoe are combined in one, as shown at g', Fig. 10.

Sometimes, though comparatively seldom, it is found necessary to connect the brake-hanger e to the brake-beam a' independently of the brake-head g and by a separate casting. My invention, it will be understood, is equally applicable in such a case, as the essential feature of that part of the invention thus applicable consists in the application, substantially as described, of the spring h between the pivot f and the casting or equivalent device to which the hanger e is pivotally connected at the point f.

In Figs. 10 and 11 the springs k, w and h are shown as consisting of rubber cushions. In the other figures they are shown as consisting of steel coiled compression-springs.

The brake-hanger e I prefer to make as a single solid casting, as shown. This hanger is pivotally supported between two jaws $c'$ $c^2$ of the hanger-support c. (See Fig. 11.) In like manner the lower end of the brake-hanger e is located between the jaws $d'$ $d^2$ of the brake-head and said brake-hanger is provided with the flanges or projections $e'$ $e^2$ $f'$ $f^2$ for the retention of the springs h and w, respectively.

Having thus described my invention, what I claim as new, and desire to secure by Letters Patent, is—

1. In a car-truck, the combination, substantially as described, of a brake-hanger supporting the brake mechanism and pivotally connected to the truck-frame at a point intermediate between the ends of said hanger, and a brake-release spring connected to the free or outer end of said hanger and to the car-truck and arranged to release the brake from the wheel.

2. In a car-truck, the combination, substantially as described, of a brake-hanger supporting the brake mechanism and pivotally connected to the truck-frame at a point intermediate between the ends of said hanger, and a spring located between the outer or free end of said hanger and a rigid portion of the truck, said spring being arranged to remove the brake from the wheel through the expansive force of said spring.

3. In a car-truck, the combination, substantially as described, of a brake-hanger supporting the brake mechanism and pivotally connected to the truck-frame at a point intermediate between the ends of said hanger, and a brake-release spring located between the outer or free end of said hanger and a rigid portion of the truck, and means for adjusting the tension of said spring.

4. In a car-truck, the combination, substantially as described, of the brake-hanger flexibly connected to the truck and supporting the brake head or mechanism, and a spring or elastic cushion inserted between said brake-hanger and brake head or mechanism, the expansive force of said spring pressing said brake-hanger and brake-head tightly against the pin holding said parts pivotally together, whereby noise or rattling at the point of junction is prevented.

5. In a car-truck, the combination, substantially as described, of a brake-hanger pivotally connected to a rigid part of the truck, and a spring inserted between said rigid part of the truck and the brake-hanger, the force of said spring causing the sides of the pivotal bolt connecting said parts together to press tightly against said truck and brake-hanger whereby noise or rattling at their pivotal point of junction is prevented.

6. In a car-truck, an antirattler-spring arranged between the brake-hanger and a rigid portion of the truck, said spring exerting its force in a substantially horizontal direction to keep a continuous and positive tension against the pivotal bolt connecting said brake-hanger and truck together, substantially as described.

7. In a car-truck, the combination, substantially as described, of a brake-hanger, a brake-head pivotally connected thereto, and a spring located between said brake head and hanger, said spring exerting its force in a substantially horizontal direction to press said brake head and hanger as far apart as possible.

8. In a car-truck, a brake-hanger provided with sockets or receptacles adapted to retain springs in proper position relatively to said brake-hanger, substantially as described.

WILLIAM ROBINSON.

Witnesses:
JAMES W. RIPLEY,
JESSE W. BIGSBY.